US 6,642,343 B2

United States Patent
Gilles et al.

(10) Patent No.: US 6,642,343 B2
(45) Date of Patent: Nov. 4, 2003

(54) POLYURETHANE RESIN, A COATING COMPOSITION COMPRISING A POLYURETHANE RESIN, USE OF A POLYURETHANE RESIN FOR PRINTING PLASTIC SUBSTRATES, METHOD OF PRODUCING A POLYURETHANE RESIN, A METHOD OF PRODUCING A LAMINATE CARRYING A PRINTED IMAGE

(75) Inventors: Eiselé Gilles, Fillinges (FR); Eugène Denis, La Roche sur Foron (FR); Catherin Gilles, Saint Genis Pouilly (FR)

(73) Assignee: Sicpa Holding S.A., Prilly (CH)

( * ) Notice: Subject to any disclaimer, the term of this patent is extended or adjusted under 35 U.S.C. 154(b) by 0 days.

(21) Appl. No.: 10/060,331

(22) Filed: Feb. 1, 2002

(65) Prior Publication Data

US 2002/0156227 A1 Oct. 24, 2002

(30) Foreign Application Priority Data

Feb. 5, 2001 (EP) .............................. 01102492

(51) Int. Cl.$^7$ ............................... C08G 18/10
(52) U.S. Cl. .............................. 528/61; 528/65; 528/76; 525/403; 525/440; 106/31.13; 156/277; 428/423.1
(58) Field of Search ................................ 525/403, 440; 528/76, 61, 65; 106/31.13; 156/277; 428/423.1

(56) References Cited

U.S. PATENT DOCUMENTS

| 5,556,925 A | 9/1996 | Kousaka et al. |
| 5,654,390 A | 8/1997 | Gajewski et al. |

FOREIGN PATENT DOCUMENTS

| EP | 0344540 A | 12/1989 |
| EP | 0604890 | 7/1994 |
| JP | 5222333 | 8/1993 |

*Primary Examiner*—Rachel Gorr
(74) *Attorney, Agent, or Firm*—Shoemaker and Mattare

(57) ABSTRACT

A polyurethane resin, which is soluble in organic solvents, is the product of at least one diisocyanate and a component having isocyanate reactive functional groups which include a first polyol group having an average molecular weight from 1000 to 10000 g/mol, a second polyol group having an average molecular weight from 10000 to 20000 g/mol, and a third polyol group having an average molecular weight not greater than 800 g/mol. The equivalent ratio of the diisocyanate to the components having isocyanate reactive functional groups is such that the resulting polyurethane resin has no unreacted polyisocyanate. When used as a film forming binder in inks, the resin provides excellent initial adhesion to plastic films.

46 Claims, No Drawings

POLYURETHANE RESIN, A COATING COMPOSITION COMPRISING A POLYURETHANE RESIN, USE OF A POLYURETHANE RESIN FOR PRINTING PLASTIC SUBSTRATES, METHOD OF PRODUCING A POLYURETHANE RESIN, A METHOD OF PRODUCING A LAMINATE CARRYING A PRINTED IMAGE

The present invention relates to a polyurethane resin, to a coating composition comprising said polyurethane resin, to the use of said polyurethane resin for printing plastic substrates, to a method of producing a polyurethane resin and to a method of producing a laminate carrying a printed image, according to the preamble of the independent claims.

Polyurethane resins are the binders of choice in solvent borne coating compositions for plastic films and in the production of image carrying laminates. Laminates are multilayered shaped articles in which—according to the needs of the final article—each of the layers consist either of the same or of different materials. The preferred materials are paper, wood, textiles, metal and plastic films. In the field of food packaging, the laminates are mostly made from plastic or metal films, in particular metallized films, or a combination of both. Film materials are chosen such that the laminates can be subjected to sterilization processes without deterioration of the film and/or the laminate. As a further advantage laminates impart to prints or generally images a satisfying appearance with respect to gloss and color fastness. Generally laminates are produced by either joining two or more layers by means of adhesives or by adhesive-free extrusion coating. Irrespective of the production process a print or generally any kind of image which does not necessarily have to be printed can be applied to one or both of the layers prior to applying the next layer (Römpp Lexikon, Lacke und Druckfarben, ed. U. Zorll, Georg Thieme Verlag, Stuttgart, New York 1998, p.214 and 318).

Coating compositions for laminates, which are mainly in the form of printing inks, have to satisfy high standards. The resin as the film forming part of the composition must provide the dried layer with the required adhesive strength both to the underlying substrate and to the adhesive or to the extruded layer. As a further requirement the resin must impart to the dried layer stability during and after sterilization processes and/or treatment in boiling water even over a prolonged period of time (e.g. during food preparation). Further the dried layer must show blocking resistance and stability during sealing of the laminate (e.g. in the production of bags). The composition—as a printing ink—must be printable in flexo and gravure printing processes which are the techniques commonly used for printing plastic films. Thus, the resin must allow the printing ink to be thinly liquid, rapidly drying and to be soluble in esters and in alcohols, in particular in ethanol.

EP-604 890 teaches a printing ink (for printing laminates) based on a polyurethane resin. The polyurethane resin is the reaction product of a high molecular weight polyol compound of a molecular weight in the range of between 3000 to 10000, a low molecular weight polyol compound of a molecular weight of less than 200, an organic diisocyanate compound, a chain extender and optionally a reaction terminating agent. The polyol compounds are chosen such that the whole of the high molecular weight polyol compound and the low molecular weight polyol compound has an average molecular weight in the range of between 1500 and 2700, the isocyanate index of the diisocyanate being more than 2.0 and the nitrogen content of the polyurethane resin derived from the isocyanate groups of the diisocyanate being from 1.3 to 1.95% by weight.

Whereas printed and dried layers produced with the ink of EP-604 890 show in most of the cases the required bond strength, the initial adhesiveness of the layers to the underlying substrate, i.e. the adhesiveness within the first 30 seconds after drying, is poor. A lack of initial adhesiveness results in at least partial transfer of the printed layers to the back side of the substrate/film to which the layer has been applied during storage on rollers or stacks. A further drawback of the prints/layers produced with the ink of EP 604 890 is their lack in heat resistance in particular on coextruded polypropylene and polyester. The latter results in damages on edges of the layers during heat treatment of the laminate. In addition the printing ink shows poor compatibility with alcohols as the solvent of choice in flexographic applications. All these drawbacks are mainly due to lack of performance of the polyurethane resin.

The object of the present invention is to overcome the drawbacks of the prior art.

In particular it is an object to provide polyurethane resins applicable as film forming binders in coating compositions. The coating compositions must be suitable for producing—in the broadest sense—any kind of dried layers on plastic films and/or laminates. The polyurethane resin must provide the dried layer with an excellent initial adhesiveness in particular such that the layer is not damaged during storing and further processing of the substrate/film and during finishing of the laminate. Further, the resin has to reduce the risk of delamination during sealing of the plastic film or laminate, has to be heat resistant and soluble in alcohols and ester.

A further object is to provide a method for producing said polyurethane resin.

It is still another object of the present invention to provide a printing ink for plastic substrates and laminates wherein the printed and dry layers adhere initially well to the substrate and wherein the ink is printable by flexographic and/or gravure printing processes.

These objects are solved by the features of the independent claims.

In particular, they are solved by a polyurethane resin being the reaction product of at least one diisocyanate and components having isocyanate reactive functional groups, said components comprising a first group of at least one polyol, a second group of at least one polyol and a third group of at least one polyol and optionally at least one amine and a reaction terminating agent wherein all polyols of said first group are of an average molecular weight in the range of between 1000 to 10000 g/mol, wherein all polyols of said second group are of an average molecular weight in excess of 10000 up to 20000 g/mol, wherein all polyols of said third group are of an average molecular weight of equal or less than 800 g/mol and wherein the ratio of the equivalent weights of the diisocyanate to the components having isocyanate reactive functional groups is selected such that essentially all of the isocyanate groups of the diisocyanate are present as the reaction product with one of the isocyanate reactive functional groups. This means that there are essentially no free unreacted isocyanate groups left.

The polyurethane resin is obtained by first reacting a mixture comprising a first group of at least one polyol and a second group of at least one polyol with at least one diisocyanate to a first isocyanate terminated prepolymer, wherein all polyols of said first group are of an average molecular weight in the range of between 1000 to 10000 g/mol, wherein all polyols of said second group are of an average molecular weight in excess of 10000 up to 20000 g/mol and wherein the ratio of the equivalent weights of the diisocyanate to the entirety of the polyols of the first and of the second group is in the range of between 3.6:1 to 2.3:1, in a second step reacting said first isocyanate terminated prepolymer with a third group of at least one polyol, all polyols of said third group are of an average molecular weight of equal or less than 800 g/mol to a saturated polyurethane resin.

In a preferred embodiment the first isocyanate terminated prepolymer is reacted with the said third group of polyols to a second isocyanate terminated prepolymer and in a third step said second prepolymer is reacted with at least one diamine and optionally with a terminating agent to a saturated polyurethane resin. Saturated in this context means that the polyurethane resin has essentially no free unreacted isocyanates left.

In a preferred embodiment of the present invention the average molecular weight of the polyols of said second group are in the range of between 10500 to 18000 g/mol and even more preferably between 11000 to 16000 g/mol. Preferably the average molecular weight of the polyols of said first group are in a range of between 1500 to 8500 g/mol and even more preferably between 2000 to 8000 g/mol. Preferably the average molecular weight of the polyols of the third group are equal or less than 500 g/mol and more preferably equal or less than 400 g/mol.

The polyurethane resin of the present invention has a weight average molecular weight of between 20000 to 80000 g/mol, preferably between 45000 to 65000 g/mol and is soluble in organic solvents which comprise alcohols such as ethanol and ethyl acetate.

In a preferred embodiment the polyurethane resin of the present invention has a urethanisation between 8 to 15%.

The favourable properties of the polyurethane resin with regard to its binder qualities in coatings can be influenced by a series of equivalent weight ratios between the reactands. It is to be understood that all the ratios listed hereinafter merely represent embodiments adapted to meet diverse needs of the resin:

The ratio of the equivalent weights of the diisocyanate to the components having isocyanate reactive functional groups is preferably in a range of between 0.95:1 to 1.2:1, more preferably of between 1:1 to 1.1:1.

The ratio of the equivalent weights of the diisocyanate to the entirety of the polyols of the first and second group is in the range of between the 3.6:1 to 2.3:1, preferably 3:1.

It is assumed that in particular the polyols of the second group provide the polyurethane with those binder qualities necessary for a strong initial adhesion in particular to films made from apolar hydrocarbons such as polypropylene. The equivalent weight ratio of the polyols of the first group to the polyols of the second group is preferably in a range of between 1.5:1 to 9:1, even more preferably of between 3:1 to 8:1, and most preferably between 5:1 to 6:1. However, for certain applications it is preferred to use a lower amount of the polyols of the second group. Therefore, according to another preferred embodiment of the present invention, the equivalent weight ratio of the polyols of the first group to the polyols of the second group is preferably in a range of between 50:1 to 60:1.

The ratio of the equivalent weights of the sum of the polyols of the first and of the second group to the polyols of the third group is in the range of between 0.9:1 to 1.2:1.

The ratio of the equivalent weights of the diisocyanate to the amines is particularly in a range of 3.1:1 to 4.7:1, preferably 3.3:1 to 3.7:1 and even more preferably 3.6:1.

The ratio of the equivalent weights of the sum of the polyols of the first, second and third group to the amines is in a range of between 3.8:1 to 1.7 1, preferably 2.1:1 to 2.7:1 and even more preferably 2.4:1.

Further preferred is that the average molecular weight of the sum of the polyols of the first, second, and third group is in the range of 3000 to 5000 g/mol, preferably 3300 to 4000 g/mol.

In a preferred embodiment the diisocyanates are selected from the groups consisting of isophorone-diisocyanate (IPDI), 4,4'-diisocyanato-diphenylmethane (MDI), hexamethylene-diisocyanate (HMDI) dicyclohexylmethane diisocyanate and toluol-diisocyanate (TDI). In particular the IPDI is either used alone or in a 1:1 mixture with MDI. In a further preferred embodiment even polyisocyanate resins are applicable.

As components having isocyanate reactive functional groups only those components are applied which contain hydroxy and/or amine groups. Although aminoalcohols (compounds containing hydroxy and amine groups) are not excluded from the present invention, pure components, i.e. components which have either hydroxy or amine groups as the only isocyanate reactive functional groups are preferred.

The polyols of the first group are preferably selected from the group consisting of dihydroxy- and trihydroxy-polyether polyols and polyester polyols with a hydroxy value in a range of between 12 and 56 mg KOH/g.

In a preferred embodiment the polyols of the second group are selected from the group consisting of dihydroxy-polyether polyols.

The polyols of the third group are selected from the group consisting of monomeric diols, such as neopentyl glycol, hexane diol or 1.4 butanediol, dihydroxy polyether polyols, polyester-polyols, hard ketonic resins having preferably a hydroxy value of at least 280 mg KOH/g but not more than 500 mg KOH/g. In a preferred embodiment the hard ketonic resin is the hydrogenated condensation product of a formaldehyde and an aliphatic and/or aromatic ketone. The polyester-polyols preferably have a hydroxy value of at least 140 mg KOH/g. Preferably the polyester-polyol is an adipate polyester based polyol.

Polyoxyalkylene glycols are the most preferred dihydroxy polyether-polyols. Polypropylene glycol(PPG) has worked out to be the most suitable polyoxyalkylene glycol in the synthesis of the polyurethane resin of the present invention. Further preferred as dihydroxy polyether-polyol is a polycaprolactone based polyether.

A polyurethane resin wherein the polyols of the first, second and third group are chosen only among polyoxyalkylene glycols are particularly preferred. Good results are obtained by realizing the first polyol as a mixture of two polyoxyalkylene glycols, one of them being of an average molecular weight of between 3500 to 4500 g/mol and the other being in the range of from 7500 to 8500 g/mol and mixing them with a polyoxyalkylene glycol of an average molecular weight in the range of between 11500 to 12500 g/mol as the polyol from the second group. The polyol of the third group is again a mixture of polyoxyalkylene glycol of an average molecular weight of between 350 to 450 g/mol and a monomeric diol such as 1.4 butane diol. The so obtained polyurethane resin shows excellent performance as binder in coatings (called type A hereinafter). For type A the polyoxyalkylene glycols of the second and third group are preferably chosen among polypropylene glycols.

Proceeding from the preferred synthesis for type A further preferred polyurethane resins are obtainable by substituting the mixture of the polyoxyalkylene glycols in the first group by at least one polyester polyol with a hydroxy value of from 12 mg KOH/g to 56 mg KOH/g, thereby keeping the polyols of the second and third group alike (type B). Also the substitution of the polyoxyalkylene glycol of the third group by at least one hard ketonic resin leads to a polyurethane resin of a satisfying performance (type C). Preferred are ketonic resins having a hydroxy value of around 325 mg KOH/g (DIN 53240) and a melting point of 110–120° C. Ketonic resins preferably have a Tg of between 80–130° C.

The at least one amine applied in the synthesis of the polyurethane resin of the present invention is selected from those having an average molecular weight in the range of between 60 to 400 g/mol. Preferably at least one amine is a diamine. The diamine is preferably selected from the group of 1.3 bis (amino ethyl) cyclohexane, m-xylene diamine or isophorone diamine. Isophorone diamine (IPDA) influences the initial adhesion of coatings to some kind of plastic substrates favourably.

The terminating agents are selected from the group consisting of monoethanol amines such as di-, triethanolamine, ethanol, n-propanol, isopropanol, 1.4-butandiol.

Further part of the present invention is a coating composition comprising an organic solvent and the polyurethane resin of the present invention as at least one of the film forming binders. In a preferred embodiment the coating composition is a printing ink for printing plastic substrates and for the production of printed laminates. In both the coating composition and the printing ink, the polyurethane resin can be applied as the sole film forming binder.

The solvent is selected from the group of polar organic solvents, preferably from the group of alcohols and esters.

The polyurethane resin allows the printing ink to be easily adjusted to the needs of flexographic and gravure printing. Such an ink is soluble in alcohols, e.g. in ethanol, has a low viscosity, thus is thinly liquid, with a viscosity preferably between 30 to 100 seconds in a Cup 4 at 23° C. or 80 to 350 mPa.s at 23° C.

Depending on the chemical structure of the polyurethane resin and thus on the chemical nature of the reactands and their respective ratios to each other the printing inks are adjustable to the needs of different kinds of plastic substrates and/or application methods. A layer made from a coating composition having comprised the polyurethane resin of type A as binder shows good initial adherence to a polyolefinic substrate, wherein the polyurethane resin of type B provides the dried layer with an outstanding initial adhesion for a PET substrate, although also applicable to polyolefinic substrates. Type C is in particular suitable for metallized films.

In the context of the present invention the following definitions are given:

The molecular weights are expressed as weight average molecular weights.

The average molecular weight of sum of the polyols of the first, second, and third group is calculated $$\sum_{i,x=1}^{i,x=3}(Mw_{ix} \cdot w_{ix})$$

$Mw_{ix}$=molecular weight of polyol i in group x, wherein x=1–3

$W_{ix}$=mol fraction of polyol i in group x, wherein x=1–3

The term "film forming" is defined according to DIN 55945:1996-09. Film forming is the generic term for the transition of a coating layer from the liquid to the solid state. Film forming occurs by means of physical drying and/or curing. Both processes proceed simultaneously or one after the other. The polyurethane resin of the present invention is film forming under standard conditions (25° C., minimum 40% relative humidity). Whereas the term "drying" is more related to the process engineering used for drying the liquid layer, such as ovens and temperatures, the term "curing" is related to the chemical processes within the resin during the drying process. The polyurethane of the present invention is of the non-crosslinking type.

"Initial adhesion" is defined as being the adhesion immediately after drying and up to 30 seconds maximum after drying of the layer.

"Drying" means substantial removal of the solvent from the layer. The latter is one of the requirement that the layer becomes solid. The residual solvent in the layer is not more than 10% by weight of the weight of the overal solvent. A dried layer is a layer of a thickness between 4 and 6 µm in particular 5 µm after treatment in an IR-oven by 70–80° C. for less than one minute. In the solid state the layer is tack-free. In case the layer is thicker or thinner either the oven temperature has to be increased/decreased or the duration of heat treatment has to be adapted correspondingly.

"Layer" and "image" are used synonymously throughout the specification. Layers and images are in form of pictures, writings, overprints,(overprint varnishes) and their meaning should not be limited by their form, extension and thickness.

In the context of the present invention all technical terms shall be defined according to Römpp Lexikon, ed. U. Zoll, Georg Thieme Verlag Stuttgart, 1998.

Besides the chemical structures and molecular weights of the polyols and optionally the amines, the favorable properties of the polyurethane resin can be dependent on its synthesis. A preferred synthesis method is first reacting the diisocyanate with the entirety of the polyols with a relatively high average molecular weight, which is preferably followed by a prolongation step using polyols of a lower molecular weight and optionally diamines. Such a sequence of steps provide a distribution of urethane groups within the polyurethane resin which seems to work favorable towards an increase in initial adhesion and sealing resistance.

A further part of the present invention is therefore a method of producing a saturated polyurethane resin, said method comprising the steps of a) providing a mixture comprising a first group of at least one polyol and a second group of at least one polyol, wherein all polyols of said first group are of an average molecular weight in the range of between 1000 to 10000 g/mol, preferably between 1500 to 8500 g/mol and even more preferably between 2000 to 8000 g/mol and all polyols of said second group are of an average molecular weight in excess of 10000 up to 20000 g/mol preferably in a range of between 10500 and 18000 g/mol and even more preferably between 11000 and 16000 g/mol; and b) reacting said mixture provided in step (a) with at least one diisocyanate, wherein the ratio of the equivalent weights of the diisocyanate to the sum of the polyols of the first and of the second group is in the range of between 3.6:1 to 2.3:1.

In a preferred embodiment the method steps comprises the further step c) of providing a third group of at least one polyol with all polyols of said third group are of an average molecular weight of equal or less than 800 g/mol, preferably equal or less than 500 g/mol and even more preferably equal or less than 400 g/mol and reacting the polyols of said third group with the reaction product of step b) to a product of a higher average molecular weight than said reaction product of step b); and reacting said product of step c) with at least one diamine in a step d). Optionally the product obtained in step d) is further reacted with at least one polyol of said third group and/or a terminating agent.

The present invention further encompasses a method of producing a laminate carrying a printed image, said method comprises the step of a) providing a printing ink comprising at least one organic solvent and at least one polyurethane resin of the present invention as at least one film forming binder and b) applying a layer to a first substrate by printing said printing ink provided in step (a) in a flexographic and/or gravure printing process to said first substrate c) removing said solvent from said layer applied in step (b) thereby drying and/or curing the layer d) applying an adhesive to the layer of step (c) and finishing the laminate by applying a second substrate on the adhesive.

Preferably, the first and the second substrates are of a plastic material, preferably of polyolefinic nature. The first and the second substrate can also be of different chemical nature like polyester or polyamide.

According to the present invention, as an adhesive in this process can be used any conventional solvent-free adhesive or solvent-based adhesive. Examples for solvent-based adhesives to be used according to the present invention are Adcote 545/CAT F and Morton 301A/350A from Rohm&Haas, Novacote 275A/CA12 from Novacote Flexpack, and Henkel UK 3640/UK 6800 from Henkel. An example for a solvent-free adhesive to be used according to the present invention is Mor-free SK403/C83 from Rohm&Haas.

The adhesives are applied to the layer according to conventional methods, for example by using a hand coater. Solvent-free adhesives are preferably diluted with a conventional diluent such as ethyl acetate before application. Preferably, a solution containing 20% by weight to 80 by weight, more preferably 30 by weight to 60 by weight of the solvent-free adhesive is prepared hereby.

In the case of solvent-based adhesives, it is preferred according to the present invention to apply said adhesive to the printed layer of a substrate, and then to finish the laminate by applying a second substrate on the adhesive. In the case of a solvent-free adhesive, however, it is more preferred to apply said adhesive to an unprinted layer of a substrate, and then to finish the laminate by applying the printed layer of a second substrate to the adhesive.

Further part of the present invention is therefore a laminate produced by the method mentioned hereinbefore. Of course, the laminate can also be produced by extruding the second substrate on the first substrate carrying the dried layer. This method does not call for an adhesive.

If necessary, the ink composition of the present invention can contain additional binder resins, e.g. cellulosic resins, acrylic resins, polyvinyl chloride.

Further part of the present invention is a polyurethane resin comprising the reaction product of an isocyanate group of at least one diisocyanate and a hydroxy group of at least one dihydroxy polyether polyol of an average molecular weight in excess of 10000 up to 20000 g/mol, preferably between 10500 and 18000 g/mol, and even more preferably between 11000 and 16000 g/mol, further comprising the reaction product of an isocyanate group of at least one diisocyanate with a hydroxy group of at least one polyol of an average molecular weight in the range of between 1000 to 10000 g/mol, preferably in a range of between 1500 and 8500 g/mol, and even more preferably between 2000 and 8000 g/mol, which is selected from the group consisting of dihydroxy- and trihydroxy polyether polyols, and further comprising the reaction product of an isocyanate group with a hydroxy group of at least one polyol of an average molecular weight of equal or less than 800 g/mol, preferably equal or less than 500 g/mol, and even more preferably equal or less than 400 g/mol, which is selected from the group consisting of monomeric diols, dihydroxy polyether polyols and polyester polyols having a hydroxy value of at least 140 mg KOH/g.

Said polyurethane resin may further comprise the reaction product of an isocyanate group of at least one diisocyanate with an amine group of at least one diamine, preferably of isophorone diamine.

In this polyurethane resin, preferably the ratio of the equivalent weights of the diisocyanate to the entirety of the polyols of an average molecular weight in excess of 10000 up to 20000 and 1000 to 10000 is in the range of 3.6:1 to 2.3:1, preferably 3:1.

Said polyurethane resin is preferred used as binders in printing inks, especially for printing plastic substrates.

Another preferred embodiment according to the present invention is a polyurethane resin comprising the reaction product of at least one diisocyanate, preferably a mixture of two diisocyanates such as IPDI and MDI, and of at least one polyether polyol, for example a polypropylene glycol, of an average molecular weight of preferably between 11000 and 16000 g/mol, and of at least one polyol, preferably of two polyols, most preferably of two polyether polyols such as polypropylene glycol, of an average molecular weight in the range of between 1500 and 8500 g/mol, and of at least one polyol of an average molecular weight of equal or less than 800 g/mol, and of at least one amine, preferably at least one monoamine and one diamine such as monoethanolamine and IPDA. In this embodiment, the ratio of the equivalent weights of the polyols of the first group to the polyols of the second group is preferably in a range of between 50:1 to 60:1. The other ratios are preferably as described above with respect to the other polyurethan resins according to the present invention.

The present invention will be described in more detail by the following examples.

Method of Measurement the Initial Adhesion

A self adhesive tape (10 cm, type 683 of 3M) is applied under uniform pressure onto a printed layer immediately after drying of the layer and torn off the substrate immediately thereafter. The quantity of the print adhered to the tape is classified on a scale from 0 to 5 wherein 0 means more than 95% of the printed layer adhered to the tape, 1 means more than 50% of the printed layer adhered to the tape, 2 means less than 30% of the printed layer adhered to the tape; 3 means less than 20% of the printed layer adhered to the tape, 4 means less than 10% of the printed layer adhered to the tape and 5 is less than 2% of the printed layer adhered to the tape. The test results is executed additionally in dependence of the drying time of the printed layer.

Measurement of Heat Resistance

The heat resistance is tested with a heat sealing machine, Otto Brugger HSG/ET or Otto Brugger HSG-C996 both equipped with sealing jaws. The test is performed according to the Guiline S03/GUI/0001 Method 503/A.

General Synthesis of the Polyurethane Resin

Illustrated for Example 3 of Table 1

A five-neck flask equipped with two additions funnels, a gas introduction means, an agitator and a thermometer is charged with a mixture of 35 g ethyl acetate and 0.06 g Irganox 1076. The mixture is thermostated at 25° C. at an agitation velocity of 60 rpm and an nitrogen stream of 0.4 m³/h. The temperature is increased to 60° C. and a mixture of 2.54 g IPDI, 1.37 g of Desmodur 2460M (MDI) and 0.04 g DBTDL (catalyst) diluted in 0.04 g ethyl acetate is added to the flask. The agitation velocity is increased to 90 rpm. To the isocyanate solution a mixture of 7.88 g PPG 2000 and 26.48 g PPG 12000 in 15 g ethyl acetate is added over a period of 10 minutes. The reaction is conducted by a temperature of 74° C. for 180–240 minutes. In the second step a mixture of 0.57 g PPG 400 and 0.15 g 1.4 butane diol is slowly added to the prepolymer solution of the first step, the reaction is conducted for 30 minutes before adding in a third step 0.67 g isophorone diamine at an agitation velocity of 120 rpm. The reaction is conducted for another 15 minutes. In a fourth step 0.17 g 1,4 butane diol is added to the prepolymer solution obtained in the third step to further increase the molecular weight of the prepolymer. After a reaction time of 60–180 minutes 0.18 g monoethanol amine is added and the reaction is further conducted for 30 minutes before adding 10 g of ethanol as the fifth and last step.

The NCO-values are determined after each step and the increase in molecular weight of the polyurethane during synthesis is observed by GPC measurements (Waters 410 and 510; column Lichrogel PS 4000/40/20, calibration polypropylene glycol 400-20004000-8200-12200-16000-20000).

Specification of the Polyurethane

Mp: 47000
Solid content: 40%
Viscosity: 2000–4000 mPa s/25° C.
Nitrogen %: 1.19
Urethanization value: 11.9
Average molecular weight of the entirety of the polyols of the first, second, and third step: 3360 g/mol;
Example 1 to 12 are listed in Table 1 (Synthesis according to the General Synthesis).

Formulation of Printing Ink Comprising the Polyurethane Resins According to Examples 1 to 12 of Table 1

A letdown varnish was prepared by mixing the following ingredients for 20 minutes:

| | |
|---|---|
| Polyurethane binder | 86 parts |
| Alcohol | 9.5 parts |
| Waxes | 3.3 parts |
| Anti-foam additives | 1.2 parts |

The final ink was prepared by mixing the following ingredients during 20 minutes:

| WHITE/WHITE INK | |
|---|---|
| Letdown varnish | 30 parts |
| Nitrocellulose White paste | 45 parts |
| Alcohol | 15 parts |
| Ethyl acetate | 10 parts |
| BLUE/BLUE INK | |
| Letdown varnish | 30 parts |
| Nitrocellulose blue paste | 48 parts |
| Alcohol | 12 parts |
| Ethyl acetate | 10 parts |

Table 2 lists test results of the ink formulations containing a polyurethane resin of one of the examples 1 to 12 shown in table 1.

Initial adhesion, heat resistance and laminations/delamination strength are tested on substrates of different chemical nature and are compared to the corresponding results of a printing ink formulated according to the teaching of EP 604 890.

The following commercial available inks are used:
For the blue/blue ink LAMIUHECO
For the white/white ink LAMIHALL, both from SAKATA INX Corp., Japan
The following substrates were used:

| Product name | Chemical nature | Producer |
|---|---|---|
| MB 400 | coextruded bi-oriented polypropylene | Mobil |
| MB 200 | coextruded bi-oriented polypropylene; plain biaxially oriented transparent polypropylene film | Mobil |
| Terphane 10.10/1200 | polyester, corona treated | Toray Plastic |
| OPA | polyamide | Dupont Nemours |
| Melinex 813 | polyester | Dupont Nemours |

The initial adhesion and heat resistance are tested on basis of a layer of the printing ink to an underlying substrate. For the lamination/delamination test the bond strength is tested on basis of a layer of the printing ink between two plastic films. The counter substrate for all of the substrates tested is a low density polyethylene film.

Tested are: a print of the white ink as the only layer between the two plastic films, (indicated as white), a print of the blue ink as the only layer between the two films (indicated as blue) and a superposition of a layer of the blue and white ink between the two films (indicated as 200%).

The technique for the production of the laminate is the adhesive based lamination technique (adhesive: Mor-free SK403/C83 and Novacote 275/CA 12). A printed sample of laminate having a width of 15 mm is placed between two jaws of a (dynamometer type Lhomargy). The sample is drawn out and the substrate separated from the counter-substrate. The bond strength (g/15 mm) and the delamination aspect of the tested laminate is evaluated at a speed of 200 mm/min. The bond strength is expressed as a combination of number value and letters. The number value stands for grams needed to separate the laminate of a width of 15 mm and a dynamometer speed of 200 mm/min. The higher the value the greater the bond strength. The letters indicate the kind of breakage with regard to the layer of the printing ink:

T: Transfer of 100% of the ink layer (from the substrate to the counter substrate).
P: Splitting of the ink layer (between substrate and counter substrate).
Z: No stable value for the bond strength.
R: Break/tear of one of the two films of the laminate.

TABLE 1

| POLYURETHANE | Example 1 | | Example 2 | | Example 3 | | Example 4 | |
|---|---|---|---|---|---|---|---|---|
| | Eq | % | Eq | % | Eq | % | Eq | % |
| IPDI | 2 | 2.8 | 2 | 2.71 | 2.1 | 2.54 | 1.8 | 1.964 |
| MDI | 1 | 1.58 | 1 | 1.53 | 1 | 1.368 | 1.5 | 1.852 |
| TMXDI | | | | | | | | |
| PPG 2000 | 0.8 | 9.73 | 0.3 | 3.54 | 0.75 | 7.876 | 0.7 | 13.264 |
| PPG 4000 | | | 0.5 | 11.8 | | | | |
| PPG 8000 | | | | | | | | |
| PPG 12000 | | | | | 0.45 | 26.48 | 0.4 | 21.228 |
| PPG 16000 | | | 0.2 | 18.88 | | | | |
| PPG 20000 | 0.2 | 24.32 | | | | | | |
| PPG 400 | | | | | 0.25 | 0.568 | 0.3 | 0.612 |
| 1,4 Butanediol | 0.55 | 0.3 | 0.55 | 0.29 | 0.3 | 0.148 | 0.35 | 0.148 |
| 1,6 Hexanediol | | | | | | | | |
| IPDA | 0.8 | 0.83 | 0.8 | 0.8 | 0.75 | 0.672 | 0.7 | 0.564 |
| 1,4 Butanediol | 0.35 | 0.19 | 0.35 | 0.19 | 0.35 | 0.168 | 0.5 | 0.212 |
| Monoethanolamine | 0.35 | 0.25 | 0.35 | 0.26 | 0.27 | 0.18 | 0.27 | 0.156 |
| Ethyl acetate | | 50 | | 50 | | 50 | | 50 |
| Ethanol | | 10 | | 10 | | 10 | | 10 |
| SUM | | 100.00 | | 100.00 | | 100.00 | | 100.00 |
| Dry content | | 40% | | 40% | | 40% | | 40% |
| Mw | | 45000 | | 44000 | | 47000 | | 50000 |

| | Example 5 | | Example 6 | | Example 7 | | Example 8 | |
|---|---|---|---|---|---|---|---|---|
| | Eq | % | Eq | % | Eq | % | Eq | % |
| IPDI | 2.5 | 1.88 | 2.1 | 1.832 | 1.7 | 1.552 | 2.5 | 3.144 |
| MDI | 1 | 0.852 | 0.95 | 0.936 | 1.6 | 1.648 | 0.5 | 0.712 |
| TMXDI | | | | | | | | |
| PPG 2000 | | | | | 0.2 | 1.588 | 0.1 | 2.188 |
| PPG 4000 | | | | | 0.4 | 6.472 | 0.4 | 8.916 |
| PPG 8000 | 0.8 | 20.996 | 0.9 | 27.4 | 0.6 | 18.884 | 0.4 | 17.532 |
| PPG 12000 | 0.4 | 14.656 | 0.2 | 8.508 | 0.2 | 8.872 | 0.1 | 6.12 |
| PPG 16000 | | | | | | | | |
| PPG 20000 | | | | | | | | |
| PPG 400 | 0.6 | 0.844 | 0.3 | 0.488 | | | | |
| 1,4 Butanediol | | | 0.3 | 0.104 | 0.6 | 0.216 | 0.45 | 0.22 |
| 1,6 Hexanediol | | | | | | | | |
| IPDA | 0.95 | 0.528 | 0.8 | 0.516 | 0.8 | 0.54 | 0.65 | 0.604 |
| 1,4 Butanediol | 0.6 | 0.176 | 0.4 | 0.136 | 0.5 | 0.18 | 0.4 | 0.196 |
| Monoethanolamine | 0.17 | 0.068 | 0.17 | 0.08 | 0.1 | 0.048 | 0.55 | 0.368 |
| Ethyl acetate | | 50 | | 50 | | 50 | | 50 |
| Ethanol | | 10 | | 10 | | 10 | | 10 |
| SUM | | 100.00 | | 100.00 | | 100.00 | | 100.00 |
| Dry content | | 40% | | 40% | | 40% | | 40% |
| Mw | | 52000 | | 56000 | | 50000 | | 43000 |

| | Example 9 | | Example 10 | | Example 11 | | Example 12 | |
|---|---|---|---|---|---|---|---|---|
| | Eq | % | Eq | % | Eq | % | Eq | % |
| IPDI | 2.5 | 3.04 | 2.5 | 2.89 | | | 0.2 | 0.22 |
| MDI | 0.5 | 0.69 | 0.5 | 0.65 | | | 3 | 3.752 |
| TMXDI | | | | | 3 | 3.66 | | |
| PPG 2000 | 0.1 | 1.06 | 0.1 | 1.01 | | | | |
| PPG 4000 | 0.4 | 8.47 | 0.4 | 8.04 | 0.4 | 8.156 | 0.5 | 9.812 |
| PPG 8000 | 0.4 | 16.93 | 0.4 | 16.08 | 0.45 | 18.032 | 0.5 | 19.288 |
| PPG 12000 | | | | | 0.15 | 8.396 | 0.1 | 5.388 |
| PPG 16000 | 0.1 | 8.47 | | | | | | |
| PPG 20000 | | | 0.1 | 10.05 | | | | |
| PPG 400 | | | | | 0.29 | 0.628 | 0.3 | 0.62 |
| 1,4 Butanediol | 0.45 | 0.21 | 0.45 | 0.2 | 0.27 | 0.12 | 1 | 0.432 |
| 1,6 Hexanediol | | | | | | | 0.6 | 0.34 |
| IPDA | 0.65 | 0.58 | 0.65 | 0.56 | 0.84 | 0.712 | | |
| 1,4 Butanediol | 0.4 | 0.19 | 0.4 | 0.18 | 0.47 | 0.212 | | |
| Monoethanolamine | 0.55 | 0.36 | 0.55 | 0.34 | 0.14 | 0.084 | 0.25 | 0.148 |
| Ethyl acetate | | 50 | | 50 | | 50 | | 50 |
| Ethanol | | 10 | | 10 | | 10 | | 10 |
| SUM | | 100.00 | | 100.00 | | 100.00 | | 100.00 |
| Dry content | | 40% | | 40% | | 40% | | 40% |
| Mw | | 45000 | | 47000 | | 50000 | | 53000 |

TABLE 2

| Inks based on Polyurethane resins | Example 1 | | | Example 2 | | | Example 3 | | | Example 4 | | | Example 5 | | |
|---|---|---|---|---|---|---|---|---|---|---|---|---|---|---|---|
| ADHESION | | | | | | | | | | | | | | | |
| MB 400 | 5/5 at To | | | 5/5 at To | | | 5/5 at To | | | 5/5 at To | | | 5/5 at To | | |
| 10.10/12 co | 4/5 at To | | | 4,5/5 at To | | | 5/5 at To | | | 5/5 at To | | | 5/5 at To | | |
| OPA co | 4/5 at To | | | 4,5/5 at To | | | 5/5 at To | | | 5/5 at To | | | 5/5 at To | | |
| Melinex 813 | 5/5 at To | | | 5/5 at To | | | 5/5 at To | | | 5/5 at To | | | 5/5 at To | | |
| MB 200 | 2,5/5 at To | | | 3,5/5 at To | | | 4,5/5 at To | | | 4,5/5 at To | | | 4,5/5 at To | | |
| HEAT RESISTANCE | | | | | | | | | | | | | | | |
| MB 400 | 140° C. | | | 140° C. | | | 140° C. | | | 140° C. | | | 140° C. | | |
| 10.10/12 co | 180° C. | | | 180° C. | | | 180° C. | | | 180° C. | | | 180° C. | | |
| OPA co | 190° C. | | | 180° C. | | | 180° C. | | | 190° C. | | | 180° C. | | |
| Melinex 813 | 210° C. | | | 200° C. | | | 200° C. | | | 200° C. | | | 200° C. | | |
| LAMINATION Adhesive: Novacote 275/Ca12 Bond strenght in g/15 mm | 200% | Blue | White | 200% | Blue | White | 200% | Blue | White | 200% | Blue | White | 200% | Blue | White |
| MB 400 | 450R | 870R | 580R | 430R | 650R | 420R | 360Z | 870R | 340Z | 350Z | 870R | 350Z | 450R | 680R | 430R |
| 10.10/12 co | 250R | 280T/R | 220P | 270R | 250R | 200R | 220R | 280R | 190 | 210R | 290R | 180 | 280R | 280R | 220R |
| OPA co | 170Z | 320Z | 130 | 160Z | 150 | 150 | 140 | 150 | 160 | 150 | 150 | 150 | 160 | 150 | 150 |
| Melinex 813 | 280R | 280R | 220R | 350R | 320R | 270R | 530R | 280R | R | 500R | 260R | R | 220R | 630R | 280R |
| LAMINATION Adhesive: Morton SK403/C83 Bond strenght in g/15 mm | 200% | Blue | White | 200% | Blue | White | 200% | Blue | White | 200% | Blue | White | 200% | Blue | White |
| MB 400 | 160T | 460R | 280Z | 180T | 500R | 300Z | 170P | 620R | 240 | 160P | 600R | 250 | 110T | 780R | 480R |
| 10.10/12 co | 150T | 320R | 140 | 120T | 300R | 150 | 140T/R | R | 160R | 150T/R | R | 170R | 120T | 170R | 150 |
| OPA co | 80T | 330P | 130 | 100T | 230R | 150 | 150T | 340R | 150P | 160T | 350R | 160P | 100T | 250R | 160 |
| Melinex 813 | 100T | 250R | 140 | 130T | R | 180R | 160P | R | 230R | 150P | R | 240R | 120T | R | 180R |

| Inks based on Polyurethane resins | Example 6 | | | Example 7 | | | Example 8 | | | Example 9 | | | Example 10 | | |
|---|---|---|---|---|---|---|---|---|---|---|---|---|---|---|---|
| ADHESION | | | | | | | | | | | | | | | |
| MB 400 | 5/5 at To | | | 5/5 at To | | | 5/5 at To | | | 5/5 at To | | | 5/5 at To | | |
| 10.10/12 co | 5/5 at To | | | 5/5 at To | | | 5/5 at To | | | 5/5 at To | | | 5/5 at To | | |
| OPA co | 5/5 at To | | | 5/5 at To | | | 5/5 at To | | | 5/5 at To | | | 5/5 at To | | |
| Melinex 813 | 5/5 at To | | | 5/5 at To | | | 5/5 at To | | | 5/5 at To | | | 5/5 at To | | |
| MB 200 | 4,5/5 at To | | | 4,5/5 at To | | | 4,5/5 at To | | | 4,5/5 at To | | | 4,5/5 at To | | |
| HEAT RESISTANCE | | | | | | | | | | | | | | | |
| MB 400 | 150° C. | | | 140° C. | | | 140° C. | | | 140° C. | | | 140° C. | | |
| 10.10/12 co | 180° C. | | | 180° C. | | | 180° C. | | | 180° C. | | | 180° C. | | |
| OPA co | 190° C. | | | 190° C. | | | 190° C. | | | 190° C. | | | 190° C. | | |
| Melinex 813 | 190° C. | | | 190° C. | | | 200° C. | | | 200° C. | | | 200° C. | | |
| LAMINATION Adhesive: Novacote 275/Ca12 Bond strenght in g/15 mm | 200% | Blue | White | 200% | Blue | White | 200% | Blue | White | 200% | Blue | White | 200% | Blue | White |
| MB 400 | 370Z | 580R | 450R | 150 | 850R | 380R | 420R | 390R | 450R | 400R | 380R | 440R | 440R | 400R | 430R |
| 10.10/12 co | 260R | 250R | 220T | 170R | 170Z | 190P | 260R | 320R | 230R | 250R | 330R | 230R | 250R | 300R | 200R |
| OPA co | 160 | 310Z | 160 | 150 | 150 | 150 | 280Z | 250Z | 150Z | 250Z | 230Z | 140Z | 280Z | 240Z | 140Z |
| Melinex 813 | 250R | 280R | 220R | 150R | 320R | 280R | 380R | 380R | 370R | 370R | 370R | 360R | 360R | 360R | 350R |
| LAMINATION Adhesive: Morton SK403/C83 Bond strenght in g/15 mm | 200% | Blue | White | 200% | Blue | White | 200% | Blue | White | 200% | Blue | White | 200% | Blue | White |
| MB 400 | 220T | 640R | 250P | 420R | 840R | 580R | 340P | 820R | 280Z | 350P | 800R | 280Z | 320P | 800R | 280Z |
| 10.10/12 co | 110T | R | 130 | R | 240R | 150 | 160 | R | 140R | 150 | R | 130R | 150 | R | 140R |
| OPA co | 100T | 250R | 140 | 220Z/R | 240Z/R | 160 | 180 | 390R | 130 | 170 | 380R | 120 | 180 | 390R | 140 |
| Melinex 813 | 120T | R | 150 | 220R | 290R | 230R | 210 | 420R | R | 210 | 400R | R | 210 | 400R | R |

TABLE 2-continued

| Inks based on Polyurethane resins | Example 11 | Example 12 | EP 604 890 inks |
|---|---|---|---|
| ADHESION | | | |
| MB 400 | 5/5 at To | 5/5 at To | 0/5 at To |
| 10.10/12 co | 5/5 at To | 5/5 at To | 5/5 at To |
| OPA co | 5/5 at To | 5/5 at To | 5/5 at To |
| Melinex 813 | 5/5 at To | 5/5 at To | 5/5 at To |
| MB 200 | 4/5 at To | 4,5/5 at To | 0/5 at To |
| HEAT RESISTANCE | | | |
| MB 400 | 140° C. | 140° C. | 140° C. |
| 10.10/12 co | 180° C. | 180° C. | 180° C. |
| OPA co | 190° C. | 180° C. | 180° C. |
| Melinex 813 | 200° C. | 190° C. | 180° C. |
| LAMINATION Adhesive: Novacote 275/Ca12 Bond strenght in g/ 15 mm | 200% Blue White | 200% Blue White | 200% Blue White |
| MB 400 | 400R 360R 400R | 460R 870R 450R | 360T 330T 580R |
| 10.10/12 co | 240R 280R 200R | R 220R 130T | 150T 150T 350R |
| OPA co | 200Z 200Z 100Z | 150 140Z 120T | 150T 180Z 400Z |
| Melinex 813 | 370R 350R 330R | 250R 220R 320R | R 340R R |
| LAMINATION Adhesive: Morton SK403/C83 Bond strenght in g/ 15 mm | 200% Blue White | 200% Blue White | 200% Blue White |
| MB 400 | 300P 700R 250Z | 200T 800R 300P | 530R 540R 480R |
| 10.10/12 co | 140 R 140R | 170T 150R 140R | 280R 300R 380R |
| OPA co | 150 390R 130 | 150T 140 150 | 290Z 720R 270Z |
| Melinex 813 | 200 420R R | 180T 150 150P | R 340R R |

What is claimed is:

1. A polyurethane resin being the reaction product of at least one diisocyanate and components having isocyanate reactive functional groups, said components comprising a first group of at least one polyol, a second group of at least one polyol and a third group of at least one polyol, wherein all polyols of said first group have an average molecular weight from 1000 to 10000 g/mol, wherein all polyols of said second group have an average molecular weight in excess of 10000 up to 20000 g/mol, wherein all polyols of said third group have an average molecular weight equal to or less than 800 g/mol and wherein the equivalent ratio of the diisocyanate to the components having isocyanate reactive functional groups is selected such that essentially all of the isocyanate groups of the diisocyanate are present as the reaction product with one of said isocyanate reactive functional groups.

2. A polyurethane resin according to claim 1, wherein said components further comprise at least one amine and a reaction-termination agent.

3. A polyurethane resin according to claim 2 wherein the equivalent ratio of the diisocyanate to said at least one amine is from 3.1:1 to 4.7:1.

4. A polyurethane resin according to claim 2 wherein the equivalent ratio of the sum of the polyols of the first, second and third group to said at least one amine is from 3.8:1 to 1.7:1.

5. A polyurethane resin according to claim 2 wherein said at least one amine is a diamine selected from the group consisting of isophoronediamine, m-xylene diamine, 1,3 bis (aminoethyl) cyclohexane and mixtures thereof.

6. A polyurethane resin according to claim 1 wherein the equivalent ratio of the diisocyanate to the entirety of the polyols of the first and of the second group is from 3.6:1 to 2.3:1.

7. A polyurethane resin according to claim 1, wherein polyols of that second group have an average molecular weight from 10500 to 18000 g/mol.

8. A polyurethane resin according to claim 1 wherein the equivalent ratio of the diisocyanate to the components having isocyanate reactive functional groups is from 0.95:1 to 1.2:1.

9. A polyurethane resin according to claim 1 wherein the equivalent ratio of the polyols of the first group to the polyols of the second group is from 1.5:1 to 9:1.

10. A polyurethane resin according to claim 1, wherein the equivalent ratio of the polyols of the first group to the polyols of the second group is from 50:1 to 60:1.

11. A polyurethane resin according to claim 1 wherein the equivalent ratio of the sum of the polyols of the first group and the polyols of the second group to the polyols of the third group is from 0.9:1 to 1.2:1.

12. A polyurethane resin according to claim 1 wherein the polyols of the first group are selected from the group consisting of dihydroxy- and trihydroxy polyether polyols and polyester polyols with a hydroxy from 12 to 56 mg KOH/g.

13. A polyurethane resin according to claim 1 wherein the polyols of the second group are dihydroxy polyether polyols.

14. A polyurethane resin according to claim 1 wherein the polyols of the third group are selected from the group consisting of monomeric diols, dihydroxy polyether polyols, polyester polyols and hard ketonic resin.

15. A polyurethane resin according to claim 14 wherein the dihydroxy polyether polyol is selected from the group consisting of polyoxyalkylene glycol.

16. A polyurethane resin according to claim 1 wherein the average molecular weight of the sum of the polyols of the first, second and third groups is from 3000 to 5000 g/mol.

17. A polyurethane resin produced by first reacting a mixture comprising a first group of at least one polyol and a second group of at least one polyol with at least one diisocyanate to a first prepolymer, wherein all polyols of said first group have an average molecular weight from 1000 to 10000 g/mol, wherein all polyols of said second group have an average molecular weight in excess of 10000 up to 20000 and wherein the equivalent ratio of the diisocyanate to the entirety of the polyols of the first and of the second group is from 3.6:1 to 2.3:1, and then reacting said first isocyanate terminated prepolymer with an amount of a third component comprising a third group of at least one polyol, all polyols of said third group having an average molecular weight of equal to or less than 800 g/mol, said amount being sufficient to form a saturated polyurethane resin containing substantially no unreacted polyisocyanate.

18. A polyurethane resin according to claim 17 wherein said third component further comprises at least one diamine and said first isocyanate terminated prepolymer is reacted with said third group of polyols to produce a second isocyanate terminated prepolymer, which is then further reacted with said at least one diamine.

19. A polyurethane resin according to claim 18 wherein the equivalent ratio of the diisocyanate to said at least one diamine is from 3.1:1 to 4.7:1.

20. A polyurethane resin according to claim 18 wherein the equivalent ratio of the sum of the polyols of the first, second and third group to said at least one diamine is from 3.8:1 to 1.7:1.

21. A polyurethane resin according to claim 18 wherein said at least one diamine is selected from the group consisting of isophoronediamine, m-xylene diamine, 1,3 bis (aminoethyl) cyclohexane and mixtures thereof.

22. A polyurethane resin according to claim 18, further comprising a reaction-terminating agent for producing a saturated polyurethane resin.

23. A polyurethane resin according to claim 17, wherein polyols of that second group have an average molecular weight from 10500 to 18000 g/mol.

24. A polyurethane resin according to claim 17 wherein the equivalent ratio of the diisocyanate to the components having isocyanate reactive functional groups is from 0.95:1 to 1.2:1.

25. A polyurethane resin according to claim 17 wherein the equivalent ratio of the polyols of the first group to the polyols of the second group is from 1.5:1 to 9:1.

26. A polyurethane resin according to claim 17, wherein the equivalent ratio of the polyols of the first group to the polyols of the second group is from 50:1 to 60:1.

27. A polyurethane resin according to claim 17 wherein the equivalent ratio of the sum of the polyols of the first group and the polyols of the second group to the polyols of the third group is from 0.9:1 to 1.2:1.

28. A polyurethane resin according to claim 17 wherein the polyols of the first group are selected from the group consisting of dihydroxy- and trihydroxy polyether polyols and polyester polyols with a hydroxy from 12 to 56 mg KOH/g.

29. A polyurethane resin according to claim 17 wherein the polyols of the second group are dihydroxy polyether polyols.

30. A polyurethane resin according to claim 17 wherein the polyols of the third group are selected from the group consisting of monomeric diols, dihydroxy polyether polyols, polyester polyols and hard ketonic resin.

31. A polyurethane resin according to claim 30 wherein the dihydroxy polyether polyol is selected from the group consisting of polyoxyalkylene glycol.

32. A polyurethane resin according to claim 17 wherein the average molecular weight of the sum of the polyols of the first, second and third groups is from 3000 to 5000 g/mol.

33. A coating composition, preferably printing ink, comprising a solvent and at least one polyurethane resin as film forming binder, said polyurethane being the reaction product of at least one diisocyanate and components having isocyanate reactive functional groups, said components comprising a first group of at least one polyol, a second group of at least one polyol and a third group of at least one polyol, wherein all polyols of said first group have an average molecular weight from 1000 to 10000 g/mol, wherein all polyols of said second group have an average molecular weight in excess of 10000 up to 20000 g/mol, wherein all polyols of said third group have an average molecular weight of equal to or less than 800 g/mol and wherein the equivalent ratio of the diisocyanate to the components having isocyanate reactive functional groups is selected such that essentially all of the isocyanate groups of the diisocyanate are present as the reaction product with one of said isocyanate reactive functional groups.

34. A method of using a polyurethane resin as at least one film forming binder in printing inks for printing on plastic substrates, said method comprising steps of providing a polyurethane resin by reacting at least one diisocyanate and components having isocyanate reactive functional groups, said components comprising a first group of at least one polyol, a second group of at least one polyol and a third group of at least one polyol, wherein all polyols of said first group have an average molecular weight from 1000 to 10000 g/mol, wherein all polyols of said second group have an average molecular weight in excess of 10000 up to 20000 g/mol, wherein all polyols of said third group having an average molecular weight equal to or less than 800 g/mol and wherein the equivalent ratio of the diisocyanate to the components having isocyanate reactive functional groups is selected such that essentially all of the isocyanate groups of the diisocyanate are present as the reaction product with one of said isocyanate reactive functional groups, providing a printing ink comprising said polyurethane resin as a film forming binder, and printing said printing ink on a plastic substrate.

35. A method of producing a saturated polyurethane resin comprising the steps of a) providing a mixture comprising a first group of at least one polyol and a second group of at least one polyol, wherein all polyols of said first group have an average molecular weight from 1000 to 10000 g/mol and all polyols of said second group have an average molecular weight in excess of 10000 up to 20000 g/mol;

b) reacting said mixture provided in step a) with at least one diisocyanate, wherein the equivalent ratio of the diisocyanate to the sum of the polyols of the first and of the second group is from 3.6:1 to 2.3:1.

36. A method according to claim 35 wherein the method comprises further steps of providing a third group of at least one polyol, wherein all polyols of said third group have an average molecular weight of equal to or less than 800 g/mol, reacting the polyols of said third group with the reaction product of step b) to a product having a higher average molecular weight than the product of step b), and further reacting said product with at least one diamine.

37. A method of producing a laminate carrying a printed layer, said method comprises the steps of
   a) providing a coating composition, comprising a polyurethane resin being the reaction product of at least one diisocyanate and components having isocyanate reactive functional groups, said components comprising a first group of at least one polyol, a second group of at least one polyol and a third group of at least one polyol, wherein all polyols of said first group have an average molecular weight from 1000 to 10000 g/mol, wherein all polyols of said second group have an average molecular weight in excess of 10000 up to 20000 g/mol, wherein all polyols of said third group have an average molecular weight of equal to or less than 800 g/mol and wherein the equivalent ratio of the diisocyanate to the components having isocyanate reactive functional groups is selected such that essentially all of the isocyanate groups of the diisocyanate are present as the reaction product with one of said isocyanate reactive functional groups;
   b) applying a layer to a first substrate, preferably a plastic foil, by printing said coating composition of step (a) in a flexographic and/or gravure printing process;
   c) removing solvent from said layer thereby drying and/or curing said layer obtained in step (b); and
   d) applying an adhesive to the dried and/or cured layer obtained in step c) and producing the laminate by applying at least a second substrate on the adhesive.

38. A laminate produced by the method of claim 37.

39. A polyurethane resin comprising the reaction product of an isocyanate group of at least one diisocyanate and a hydroxy group of at least one dihydroxy polyether polyol of an average molecular weight in excess of 10000 up to 20000 g/mol, further comprising the reaction product of an isocyanate group of at least one diisocyanate with a hydroxy group of at least one polyol of an average molecular weight from 1000 to 10000 g/mol, selected from the group consisting of dihydroxy- and trihydroxy polyether polyols, and further comprising the reaction product of an isocyanate group with a hydroxy group of at least one polyol of an average molecular weight of equal to or less 800 g/mol, selected from the group consisting of monomeric diols, dihydroxy polyether polyols and polyester polyols having a hydroxy value of at least 140 mg KOH/g.

40. A polyurethane resin according to claim 39 wherein the polyurethane resin comprises further the reaction product of an isocyanate group and an amine group of at least one diamine.

41. A polyurethane resin according to claim 39 wherein the equivalent ratio of the diisocyanate to the entirety of the polyols having an average molecular weight from 10000 to 20000 g/mol and those having an average molecular weight from 1000 to 10000 g/mol is from 3.6:1 to 2.3:1.

42. A polyurethane resin comprising the reaction product of:
   at least one diisocyanate,
   at least one polyether polyol having an average molecular weight from 11000 to 16000 g/mol,
   at least one polyol having an average molecular weight from 1500 to 8500 g/mol,
   at least one polyol having an average molecular weight equal to or less than 800 g/mol, and
   at least one amine
   wherein the equivalent ratio of the polyols having an average molecular weight from 1500 to 8500 g/mol to the polyols having an average molecular weight from 11000 to 16000 g/mol is from 50:1 to 60:1.

43. A method of using the polyurethane resin according to claim 42 as at least one film-forming binder in a printing ink for printing plastic substrates, comprising steps of
   providing a printing ink comprising said polyurethane resin as at least one film-forming binder, and
   printing said printing ink on a plastic substrate.

44. The polyurethane resin of claim 15, wherein the dihydroxy polyether polyol is a polypropyleneglycol or a caprolactone based polyether.

45. The polyurethane resin of claim 31, wherein the dihydroxy polyether polyol is a polypropyleneglycol or a caprolactone based polyether.

46. The polyurethane resin of claim 40, wherein said diamine is isophorone diamine.

* * * * *

UNITED STATES PATENT AND TRADEMARK OFFICE
CERTIFICATE OF CORRECTION

PATENT NO.     : 6,642,343 B2
DATED          : November 4, 2003
INVENTOR(S)    : Eisele et al.

It is certified that error appears in the above-identified patent and that said Letters Patent is hereby corrected as shown below:

<u>Title page,</u>
Item [75], Inventors, should read -- Gilles Eiselé, Fillinges (FR);
Denis Eugène, La Roche sur Foron (FR)
Gilles Catherin, Saint Genis Pouilly (FR) --

Signed and Sealed this

Tenth Day of February, 2004

JON W. DUDAS
*Acting Director of the United States Patent and Trademark Office*